(12) United States Patent
Eccles et al.

(10) Patent No.: US 8,327,880 B2
(45) Date of Patent: Dec. 11, 2012

(54) SENSOR REPLACEMENT VALVE

(75) Inventors: Steven Robert Eccles, Torrance, CA (US); Frank Babayi, Irvine, CA (US)

(73) Assignee: Honeywell International Inc., Morristown, NJ (US)

(*) Notice: Subject to any disclaimer, the term of this patent is extended or adjusted under 35 U.S.C. 154(b) by 538 days.

(21) Appl. No.: 12/569,143

(22) Filed: Sep. 29, 2009

(65) Prior Publication Data
US 2011/0073193 A1 Mar. 31, 2011

(51) Int. Cl.
*F16K 31/06* (2006.01)

(52) U.S. Cl. ............... 137/595; 137/601.01; 137/601.12; 251/251

(58) Field of Classification Search ............ 137/601.01, 137/601.12, 601.15, 595, 597, 15.01, 530, 137/528, 14, 315.01, 625.37, 625.31; 251/251, 251/252, 253
See application file for complete search history.

(56) References Cited

U.S. PATENT DOCUMENTS

| | | | |
|---|---|---|---|
| 4,355,654 A | 10/1982 | Levesque et al. | |
| 4,804,164 A * | 2/1989 | Nakazawa et al. | 251/335.3 |
| 4,964,434 A * | 10/1990 | Bieri | 137/565.33 |
| 5,398,725 A * | 3/1995 | Nakazawa et al. | 137/636.1 |
| 6,170,798 B1 | 1/2001 | Johnson et al. | |
| 6,349,735 B2 * | 2/2002 | Gul | 137/15.09 |
| 6,484,587 B2 * | 11/2002 | Gul | 73/756 |
| 7,231,831 B1 * | 6/2007 | Lancaster | 73/756 |
| 7,591,133 B2 | 9/2009 | Wright | |
| 2001/0022197 A1 * | 9/2001 | Lewis et al. | 137/597 |
| 2006/0138376 A1 * | 6/2006 | Birch | 251/285 |

* cited by examiner

*Primary Examiner* — Craig Schneider
*Assistant Examiner* — Seth Faulb
(74) *Attorney, Agent, or Firm* — Shimokaji & Assoc., PC

(57) ABSTRACT

A fluid control system may comprise a pressurized fluid path; at least two sensors for determining a state of fluid within the main fluid path; an isolation valve; and fluid-filled connection paths between the main fluid path and each of the at least two sensors. The connection paths may comprise first sensing tubes connected between the main fluid path and the isolation valve; the isolation valve; and second sensing tubes connected between the isolation valve and the at least two sensors. Upon closure of the isolation valve, the connection paths may be interrupted so that the sensors may be isolated from the main fluid path and so that they may be removed from the system without a need to de-pressurize or drain the fluid from the main fluid path of the system.

18 Claims, 6 Drawing Sheets

SENSOR REPLACEMENT VALVE

BACKGROUND OF THE INVENTION

The present invention generally relates to fluid control systems which employ sensors for determining a state of fluids in the system and more particularly to such systems in which ease of maintenance is provided.

In some fluid control systems, a pump may be employed to pressurize fluid which is then driven through a closed-loop path to activity points of the system. For example, a hydraulic control system may use pressurized fluid to activate cylinders or hydraulic motors. Or, a cooling system may use pressurized cooling fluid to transfer heat to or from various sources of heat. During operation of such fluid control systems, it may be desirable to determine the pressure and/or temperature of the fluid at various locations within the system. Pressure sensors and/or temperature sensors may be employed to continuously measure these parameters.

Fluid control systems are often incorporated into vehicles such as aircraft. Aircraft fluid control systems may require routine maintenance to assure continued safe operability. The pressure and/or temperature sensors of these fluid control systems may need to be repaired or replaced during maintenance. Sensor replacement requires opening of the closed-loop fluid system and removal of the fluid from the system. Many fluid control systems contain a substantial quantity of expensive specialized fluid. Efforts associated with draining and re-filling the fluid control system and possible loss of the fluid contribute to high maintenance costs of vehicles such as aircraft.

In some aircraft, the sensors may be located in various positions in the aircraft which may not be readily accessible for routine maintenance. Gaining access to sensors for maintenance purposes may also contribute to high maintenance costs.

As can be seen, there is a need to provide fluid control systems in which replacing and/or repairing of sensors may be performed without a need to drain and refill, or de-pressurize the fluid control system. Furthermore there is a need to provide such fluid control system wherein the sensors may be readily accessible for maintenance purposes.

SUMMARY OF THE INVENTION

In one aspect of the present invention, a fluid control system may comprise a main fluid path; at least two sensors for determining a state of fluid within the main fluid path; an isolation valve; and fluid-filled connection paths between the main fluid path and each of the at least two sensors. The connection paths may comprise first sensing tubes connected between the main fluid path and the isolation valve; the isolation valve; and second sensing tubes connected between the isolation valve and the at least two sensors. Upon closure of the isolation valve, the connection paths may be interrupted so that the sensors may be isolated from the main fluid path.

In another aspect of the present invention, a sensor isolation system for a fluid control system may comprise an isolation valve which may comprise at least one cylinder with a closed end having an inlet and an outlet port formed through the closed end; at least one piston movably positionable within the at least one cylinder so that the inlet and outlet ports are open when the piston is in a first position and so that a free end of the at least one piston occludes the inlet and outlet ports when the piston is in a second position; a first pressure sensing tube connecting a main fluid path of the fluid control system with the inlet port; and a second pressure sensing tube connecting the outlet port to a fluid-state sensor. Movement of the piston into its second position may isolate the sensor from the main fluid path.

In a further aspect of the present invention, a method for a method of removing a sensor from a fluid control system without draining fluid from the system may comprise the steps of: providing at least two sensors to determine a state of fluid in a main fluid path of the system; providing fluid-filled connection paths between the main fluid path and each of the at least two sensors wherein the connection paths include an isolation valve; closing the isolation valve to interrupt the connection paths so that the sensors are isolated from the main fluid path when removal of any one or more of the sensors is required for repair or replacement; and removing one or more of the sensors. The removing step may be performed without draining fluid from the main fluid path.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide closed-loop fluid control systems in which sensor maintenance may be facilitated with a valve arrangement that isolates the sensors from a main fluid path of the system during removal and/or replacement of the sensors. Sensor removal may then proceed without a need to drain or de-pressurize the fluid in the system. The valve may block fluid flow to a plurality of the sensors simultaneously so that all sensors of the system may be replaced in a single maintenance cycle. Additionally, the valve arrangement may facilitate placement of the sensors in locations that are readily accessible for maintenance purposes.

Figure 1:
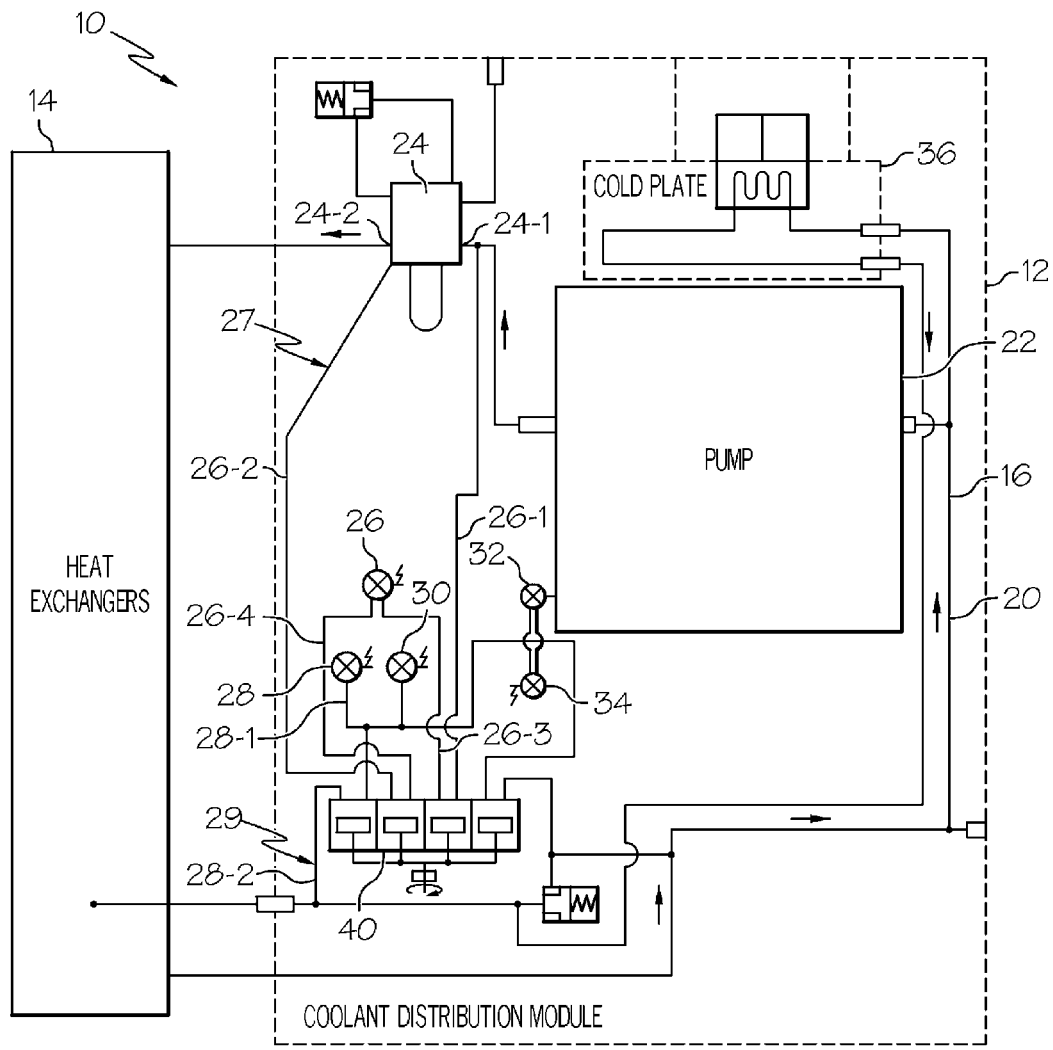
FIG. 1 is a schematic block diagram of a fluid control system in accordance with an embodiment of the present invention.
Figure 2:
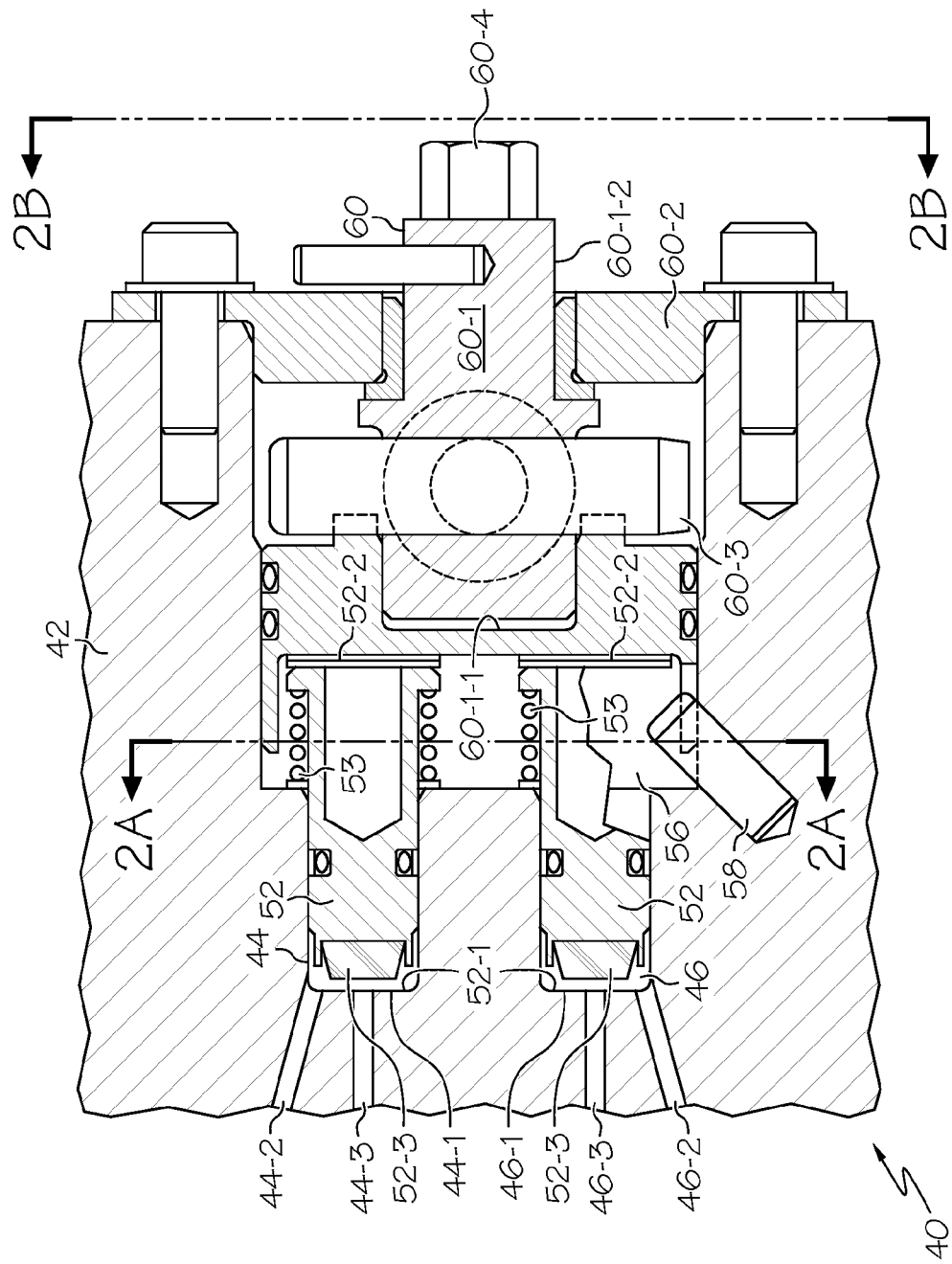
FIG. 2 is a partial cross-sectional view of an isolation valve in accordance with an embodiment of the present invention.
Figure 2A:
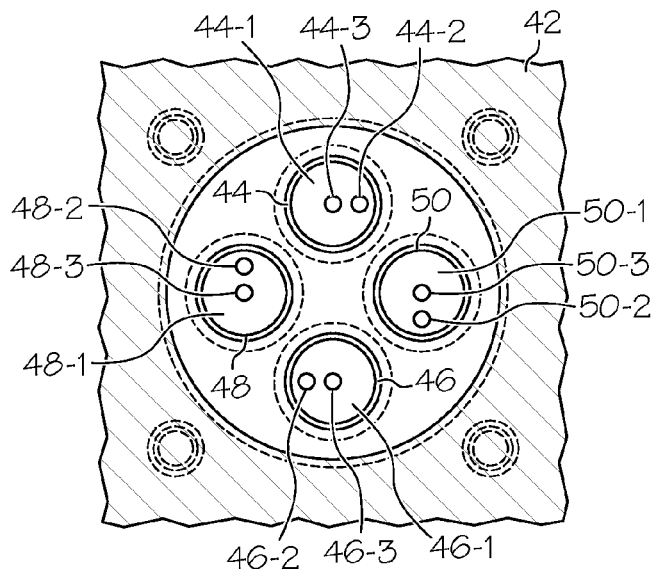
FIG. 2A is a partial cross-sectional view of the isolation valve of FIG. 2 in accordance with an embodiment of the present invention.
Figure 2B:
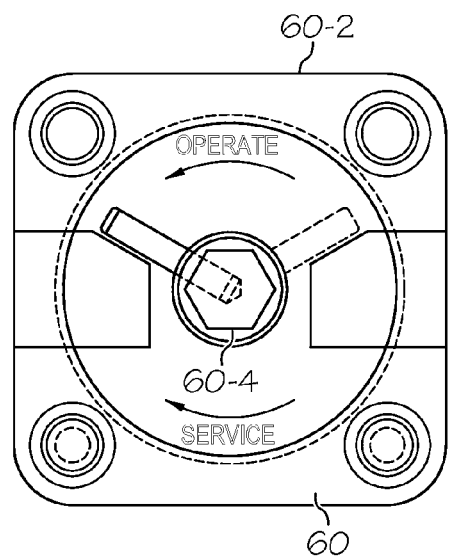
FIG. 2B is a partial elevation view of the isolation valve of FIG. 2 in accordance with an embodiment of the present invention.
Figure 2C:
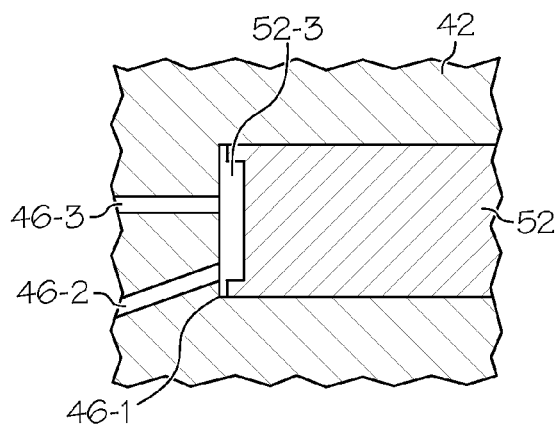
FIG. 2C is an enlarged view of a portion of the isolation valve of FIG. 2 in accordance with an embodiment of the present invention.
Figure 4:
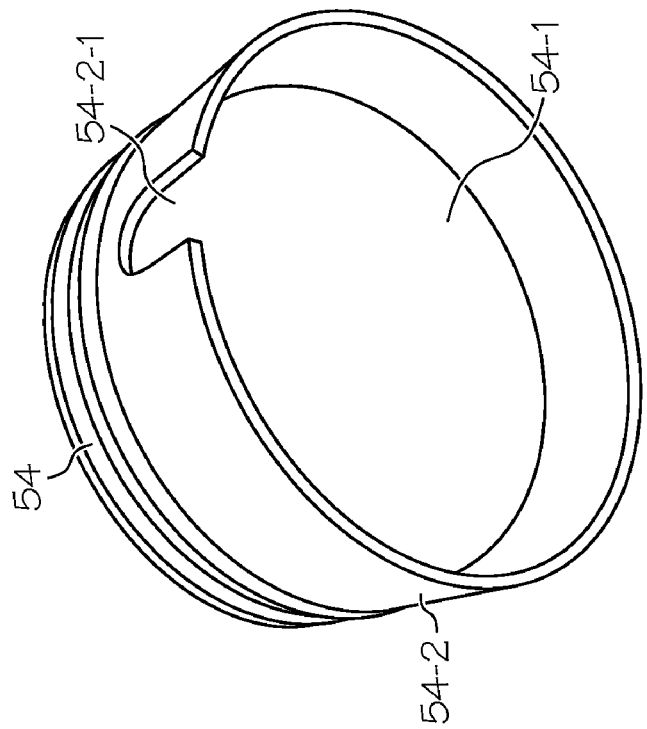
FIG. 4 is a second perspective view of driving member of FIG. 3 in accordance with an embodiment of the present invention.
Figure 3:
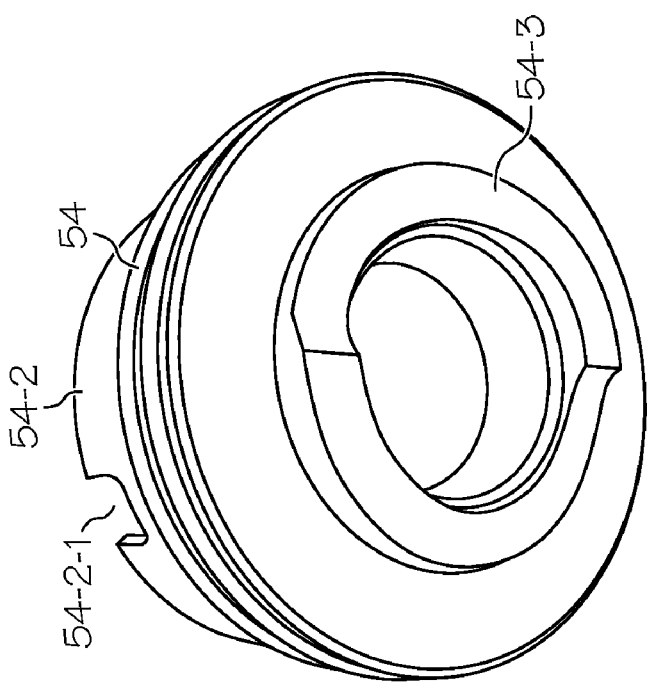
FIG. 3 is a first perspective view of driving member of the isolation valve of FIG. 2 in accordance with an embodiment of the present invention.
Figure 5:
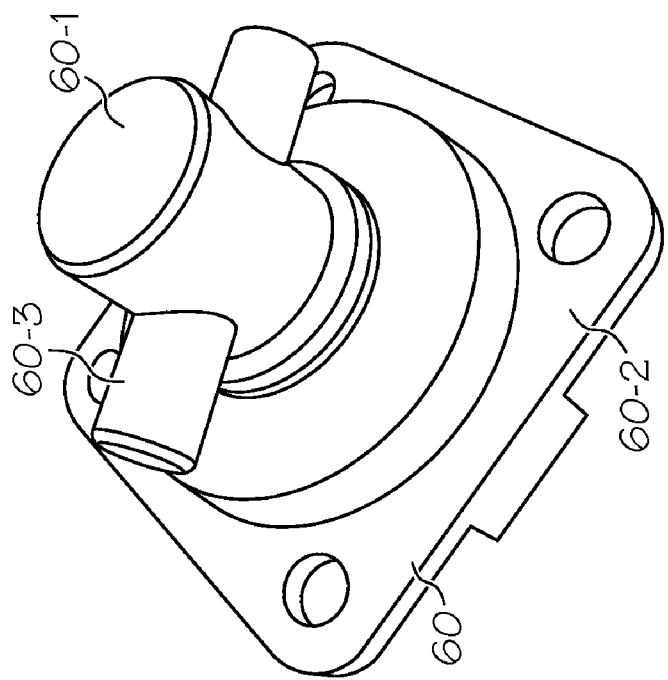
FIG. 5 is a first perspective view of a cam driver of the isolation valve of FIG. 2 in accordance with an embodiment of the present invention.
Figure 6:
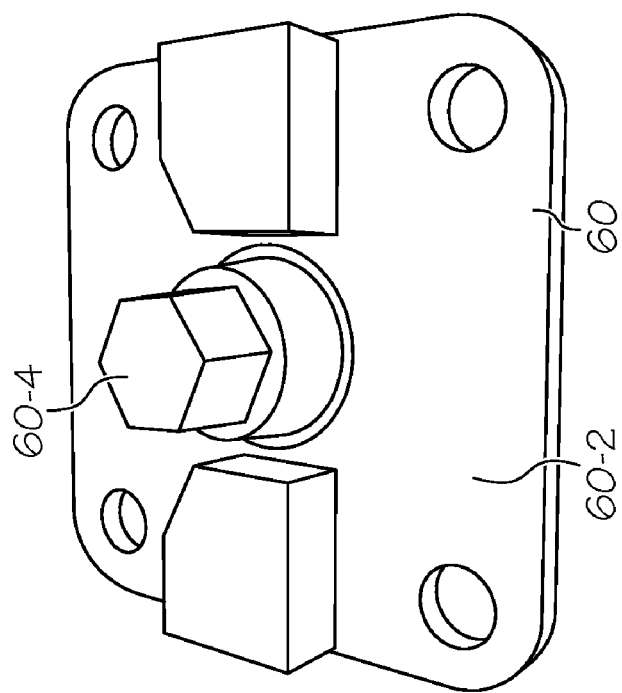
FIG. 6 is a second perspective view of the cam driver of FIG. 5 in accordance with an embodiment of the present invention.

Referring now to FIG. 1, an exemplary embodiment of the invention may comprise a fluid control system 10 with a coolant distribution module 12 and various heat exchangers collectively designated by the numeral 14. A main fluid path 16 may interconnect the coolant distribution module 12 with the heat exchangers 14. A fluid 20 may be pressurized and circulated through the main fluid path 16 by a pump 22.

Fluid pressure may vary from one point to another as the fluid 20 passes through the system 10. For example, a pressure drop may occur as the fluid 20 fluid passes through a filter 24. A differential pressure sensor 26 may be incorporated into the fluid control system 10 so that the magnitude of the filter pressure drop may be continuously monitored.

Fluid pressure may also vary at various other locations in the system 10. Pressure sensors may be employed to monitor these pressure variations. For example, an absolute pressure sensor 28 may be employed to monitor pressure within the heat exchanger 14. In an aircraft, the pressure sensor 28 may be paired with another sensor 30 to provide redundancy. Also, a redundant pair of differential pressure sensors 32 and 34 may be employed to monitor pressure differential between heat exchanger pressure and pressure in a cold plate 36.

It may be noted that the various pressure sensors of the system 10 may not be directly connected to their respective sensing locations. The sensors may be interconnected with their respective sensing locations through a sensor replacement valve or isolation valve 40.

For example, the pressure sensor 26 may be connected to the filter 24 with sensing tubes 26-1 and 26-2. The sensing tube 26-1 may be tapped into the fluid path 16 at an inlet side 24-1 of the filter 24. The sensing tube 26-2 may be tapped into the fluid path 16 at an outlet side 24-2 of the filter 24. The sensing tubes 26-1 and 26-2 may be connected to the isolation valve 40. The isolation valve 40 may be connected to the sensor 26 with sensing tubes 26-3 and 26-4. In this regard, the sensor 26 may be considered to be indirectly connected to the filter 24 through a fluid-filled connection path 27 that includes the isolation valve 40.

In a manner that will be explained hereinafter in detail, the isolation valve 40 may be operated to block passage of the fluid 20 between the tubes 26-1 and 26-3 and between the tubes 26-2 and 26-4. It may be seen that with such blocking, the sensor 26 may be removed from the sensing tubes 26-3 and 26-4 without a need to de-pressurize or drain the fluid 20 from the main fluid path 16.

Similarly, the sensors 28, 30, 32 and 34 may be indirectly connected to their respective pressure sensing locations through the isolation valve 40. For example, the sensor 28 may be indirectly connected to the main fluid path 16 through a connection path 29 which may comprise sensing tube 28-1 and 28-2 and the isolation valve 40. The isolation valve 40 may be employed to block passage of the fluid 20 to any or all of the sensors 26, 28, 30, 32 and/or 34, thus facilitating their removal and replacement or repair without a need to depressurize or drain the fluid 20 from the closed-loop fluid path 16.

Referring now to FIGS. 2 through 6, exemplary operational and construction features of the isolation valve 40 may be understood. The isolation valve 40 may comprise a valve body 42 with a plurality of valve cylinders 44, 46, 48 and 50. A corresponding plurality of valve pistons 52 may be positioned within the cylinders 44, 46, 48 and 50. The pistons 52 may be spring-biased to a normally-open position with compression springs 53. Fluid inlet ports 44-2, 46-2, 48-2, and 50-2 and fluid outlet ports 44-3, 46-3, 48-3, and 50-3 may be formed at closed ends 44-1, 46-1, 48-1 and 50-1 of the cylinders 44, 46, 48 and 50. The fluid inlet ports and the fluid outlet ports may be connected to the sensing tubes shown in FIG. 1. For the cylinder 44, for example, the fluid inlet port 44-2 may be connected to the pressure sensing tube 26-1 and the fluid outlet port 44-3 may be connected to the pressure sensing tube 26-3. For the cylinder 46, the fluid inlet port 46-2 may be connected to the pressure sensing tube 26-2 and the fluid outlet port 46-3 may be connected to the pressure sensing tube 26-4.

It may be seen that the inlet port 44-2 and the outlet port 44-3 may be simultaneously occluded by one of the pistons 52 when a free-end 52-1 of the piston 52 engages with the closed end 44-1 of the cylinder 44. In an exemplary embodiment, the piston 52 may be provided with a compressible or deformable insert 52-3 which may deform into a shape of the closed end 44-1 of the cylinder 44, thus ensuring full occlusion of the ports 44-2 and 44-3 when the piston 52 is engaged with the closed end 44-1. When the inlet port 44-2 and the outlet port 44-3 are occluded, the sensor 26 may be isolated from the inlet 24-1 of the filter 24 of FIG. 1. Similarly, when the inlet port 46-2 and the outlet port 46-3 are occluded, sensor 26 may be isolated from the outlet 24-2 of the filter 24. In other words, occlusion of the ports 44-2, 44-3, 46-2 and 46-3 may result in an isolation of the sensor 26 from the main fluid path 16. When such isolation is achieved, the sensor 26 may be removed from the system 10 without a need to drain the fluid 20 from the system 10.

In an exemplary embodiment of the isolation valve 40, a driving member 54 may be positioned within a cylindrical chamber 56 formed in the valve body 42. An exemplary configuration for the driving member 54 may be illustrated in FIGS. 3 and 4. The driving member 54 may comprise a piston engaging surface 54-1, a guiding sleeve 54-2 and an annular cam ring 54-3. The driving member 54 may move axially within the chamber 56 as the guiding sleeve 54-2 engages with the chamber 56. An aligning groove 54-2-1 may be formed in the guiding sleeve 54-2. The groove 54-2-1 may engage with an aligning pin 58 which may project from the valve body 42 into the chamber 56. Thus, the driving member 54 may not rotate about its axis as it moves axially within the chamber 56.

Figure 7:
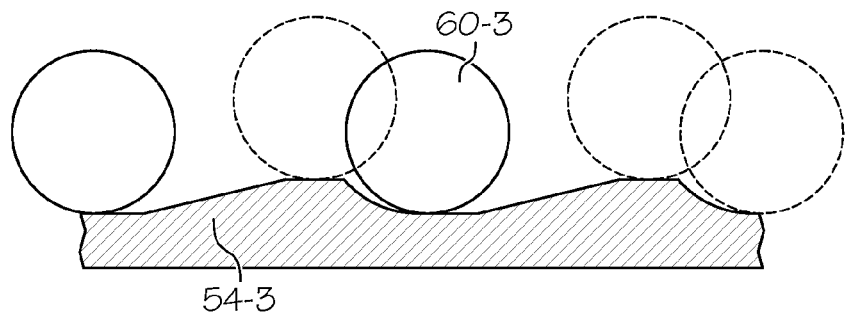
FIG. 7 is a partial cross-sectional view of a profile of a cam of the driving member of FIG. 3 in accordance with an embodiment of the present invention.

The driving member 54 may be positioned so that its piston engaging surface 54-1 may be engaged with contact ends 52-2 of the pistons 52. The driving member 54 may be forced to move axially within the chamber 58 to overcome compressive spring force from the springs 53 so that the pistons 52 may be driven away from their normally open position. Axial movement of the driving member 54 may be imparted by interaction of the cam ring 54-3 and a cam driver 60. In this regard the driving member 54 may be considered to be a cam-operated driving member The cam driver 60 (shown in detail in FIGS. 5 and 6) may include a rotatable shaft 60-1 adapted to rotate within a mounting plate 60-2. The mounting plate 60-2 may be attached to the valve body 42 so that the shaft 60-1 may align axially with the driving member 54. Cam engaging pins 60-3 may be positioned at an inner end 60-1-1 of the shaft 60-1. As the shaft 60-1 is rotated, the pins 60-3 may slide across the cam ring 54-3 and thus drive the driving member 54 axially within the chamber 56 (in an exemplary manner illustrated with particularity in FIG. 7). Consequently the pistons 52 may be moved to a closed position in which the inlet and outlet ports of the cylinders 44, 46, 48 and 50 may be occluded.

The cam driver 60 may be provided with an operating handle 60-4 at an outer end 60-1-2 of the shaft 60-1. The operating handle 60-4 may have any one of many configurations. In an exemplary embodiment of the system 10, the handle 60-4 may be hex shaped and may be readily rotated with a conventional socket wrench extension. This hex-shaped configuration may be particularly useful in fluid control systems that may be installed in confined spaces such equipment bays in aircraft.

It may be also noted that when one of the fluid control systems is configured as described above, the sensors may be positioned in locations that are remote from their respective sensing locations. For example, in the system 10 of FIG. 1, the sensors 26, 28, 30, 32 and 34 may all be located on the coolant distribution module 12. Thus all of the sensors may be readily accessible for maintenance purposes.

Figure 8:
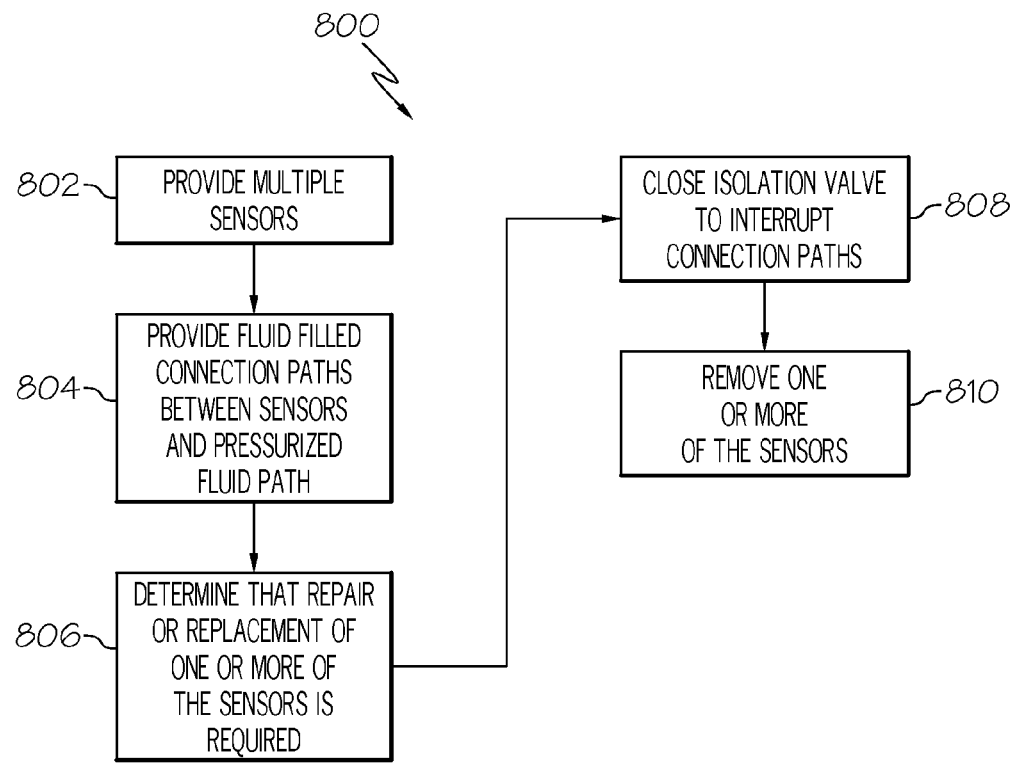
FIG. 8 is a flow chart of a method for operating a fluid control system in accordance with an embodiment of the present invention.

In one embodiment of the present invention, a method is provided for removing a sensor from a fluid control system without draining fluid from the system (e.g. the system 10). In that regard the method may be understood by referring to FIG. 8. In FIG. 8, a flow chart may portray various aspects of a method 800. In a step 802, sensors may be provided to determine a state of fluid in a main fluid path of the system (e.g., the sensors 26, 28, 30, 32 and 34 may be provided to sense pressure at various locations in the fluid control system 10). In a step 804, fluid-filled connection paths may be provided between the sensors and the main fluid path (e.g., the sensing tubes 26-1, 26-2, 26-3 and 26-4 and the isolation valve 40 may be provided to indirectly interconnect the sensor 26 to the main fluid path 16). In a step 806, determination may be made of a need to repair or replace one or more of the sensors. In a step 808, the isolation valve may be closed to isolate the sensors from the main fluid path (e.g., the valve 40 may be closed to interrupt fluid connection paths between the sensor 26 and the main fluid path 16). In a step 810, one or more of the sensors may be removed from the system for repair or replacement without draining fluid from the system.

It should be understood, of course, that the foregoing relates to exemplary embodiments of the invention and that modifications may be made without departing from the spirit and scope of the invention as set forth in the following claims.

We claim:

1. A fluid control system comprising:
a main fluid path;
at least two sensors for determining a state of fluid within the main fluid path;
an isolation valve;
fluid-filled connection paths between the main fluid path and each of the at least two sensors;
wherein the connection paths comprise:
first sensing tubes connected between the main fluid path and the isolation valve;
the isolation valve; and
second sensing tubes connected between the isolation valve and the at least two sensors;
wherein the first and second sensing tubes are connected to inlet and outlet ports in closed ends of hollow cylinders in the isolation valve;
wherein the inlet and outlet ports associated with each cylinder are non-communicating with the inlet and outlet ports of the other cylinders;
wherein pistons are positionable in the cylinders so that free ends of the pistons engage with the closed ends of the cylinders to produce closure of the isolation valve; and
wherein, upon closure of the isolation valve, the connection paths are interrupted so that the sensors are isolated from the main fluid path.

2. The fluid control system of claim 1 wherein the inlet and outlet ports comprise occludable ports in the closed ends of the cylinders.

3. The fluid control system of claim 1 further comprising compression springs engaged with the pistons to maintain the pistons disengaged from the closed ends of the cylinders when the isolation valve is open.

4. The fluid control system of claim 1 further comprising deformable inserts at the free ends of the pistons, which inserts deform to produce a secure occlusion of the inlet and outlet ports in the closed ends of the cylinder.

5. The fluid control system of claim 1 further comprising a cam-operated driving member engageable with the pistons for driving the pistons to produce closure of the isolation valve.

6. The fluid control system of claim 5 further comprising:
a cylindrical chamber in a body of the isolation valve;
wherein the driving member comprises:
a circular piston engaging surface;
a cylindrical guiding sleeve; and
an annular cam ring; and
wherein the driving member is adapted to move axially within the cylindrical chamber during closure of the isolation valve.

7. The fluid control system of claim 6 further comprising:
an aligning pin projecting into the cylindrical chamber;
wherein the cylindrical guiding sleeve comprises an aligning groove; and
wherein the aligning pin and the aligning groove interact to preclude rotation of the driving member during cam-operated closure of the isolation valve.

8. A sensor isolation system for a fluid control system comprising:
an isolation valve comprising;
a plurality of cylinders, each with a closed end having an inlet port and an outlet port formed through the closed end, wherein the inlet and outlet ports associated with each cylinder in the plurality of cylinders are non-communicating with the inlet and outlet ports of the other cylinders in the plurality of cylinders;
a piston movably positionable within each cylinder so that the inlet and outlet ports are open when the piston is in a first position and so that a free end of the at least one piston occludes the inlet and outlet ports when the piston is in a second position, wherein all of the pistons associated with a plurality of flow paths are positionable by a single cam-operated driving member adapted to move the pistons to their second position;
a first pressure sensing tube connecting a main fluid path of the fluid control system with the inlet port of a particular cylinder;
a second pressure sensing tube connecting the outlet port of the particular cylinder to a sensor; and
wherein movement of the piston into its second position isolates the sensor from the main fluid path.

9. The sensor isolation system of claim 8, wherein a plurality of the sensors are isolated from the main fluid path when the pistons are in their second position.

10. The sensor isolation system of claim 8 further comprising a compression spring for holding the piston in the first position so that the isolation valve is a normally-open isolation valve.

11. The sensor isolation system of claim 8:
wherein each piston comprises a deformable insert at one end thereof; and
wherein the deformable insert occludes the inlet and the outlet ports when an associated piston is in the second position.

12. The sensor isolation system of claim 8 wherein the cam-operated driving member moves all of the pistons to their second position simultaneously.

13. The sensor isolation system of claim 12 further comprising a rotatable cam driver engageable with the cam-operated driving member for producing axial motion of the driving member responsively to rotational motion of the cam driver.

14. A method of removing a sensor from a fluid control system without draining fluid from the system comprising the steps of:
providing a plurality of sensors to determine a state of fluid in a main fluid path of the system;
providing fluid-filled connection paths between the main fluid path and each of the at least two sensors wherein the connection paths comprise an isolation valve having a plurality of cylinders, each having an inlet port and an outlet port formed through a closed end, wherein the inlet and outlet ports associated with each cylinder in the plurality of cylinders are non-communicating with the inlet and outlet ports of the other cylinders in the plurality of cylinders;
closing the isolation valve to interrupt the connection paths so that the sensors are isolated from the main fluid path when removal of any one or more of the sensors is required for repair or replacement;
removing one or more of the sensors; and
wherein the removing step is performed without draining fluid from the main fluid path.

15. The method of claim 14 wherein the step of closing the isolation valve comprises moving pistons within the plurality of cylinders to occlude the inlet and outlet ports through which the connection paths pass.

16. The method of claim 15 wherein moving of pistons comprises the step of producing closing force with a cam ring.

17. The method of claim 16 wherein the moving of the pistons further comprises the step of rotating a cam driver to apply axially directed force on the pistons.

18. The method of claim 17 wherein the step of rotating the cam driver produces closure of the isolation valve with angular rotation of less than 180°.

\* \* \* \* \*